United States Patent [19]

Palmér

[11] Patent Number: 4,635,328
[45] Date of Patent: Jan. 13, 1987

[54] DEVICE FOR EXCHANGEABLE ATTACHMENT OF TOOLS ON AN INDUSTRIAL ROBOT

[76] Inventor: Lennart Palmér, Rinkabyholmsvägen 15, 394 77 Kalmar, Sweden

[21] Appl. No.: 482,452

[22] Filed: Apr. 6, 1983

[51] Int. Cl.⁴ ............................................. B23Q 3/155
[52] U.S. Cl. ..................................... 29/26 A; 29/568; 339/16 C; 901/42
[58] Field of Search ...................... 29/26 A, 27 C, 568; 339/15, 16 R, 16 C, 16 CR; 901/42, 50

[56] References Cited

U.S. PATENT DOCUMENTS

| 2,291,071 | 7/1942 | Brund | 339/16 C X |
| 4,054,975 | 10/1977 | Lundstrom | 29/27 C |
| 4,145,802 | 3/1979 | d'Auria | 29/568 |
| 4,310,958 | 1/1982 | Balaud et al. | 29/26 A |

FOREIGN PATENT DOCUMENTS 0112742 8/1980 Japan ...................................... 29/568

Primary Examiner—Z. R. Bilinsky
Attorney, Agent, or Firm—Nies, Webner, Kurz & Bergert

[57] ABSTRACT

A device for exchangeably attaching tools on an industrial robot comprising an attachment device. According to the invention, the attachment device (1) comprises a first member (2) rigidly attached to the outer portion (4) of a robot arm (3) and a second member (5) intended to be rigidly attached to each of one or several tools (6), by which tools (6) the robot is to carry out operations. The first member (2) comprises an electric coil (10) capable in a magnetic way to attract said second member (5) whereby the members (2.5) are retained to each other when current flows through the coil (10). Said first member (2) and said second member (5) are provided with means (15-18;23,24,26) for transferring electric current and/or compressed air or vacuum or substances between a source connected to the first member (2) and a tool (6) attached to the second member (5). According to a preferred embodiment, necessary tools are accurately positioned in expedient stands whereby the robot itself by programming can deliver and fetch tools.

2 Claims, 1 Drawing Figure

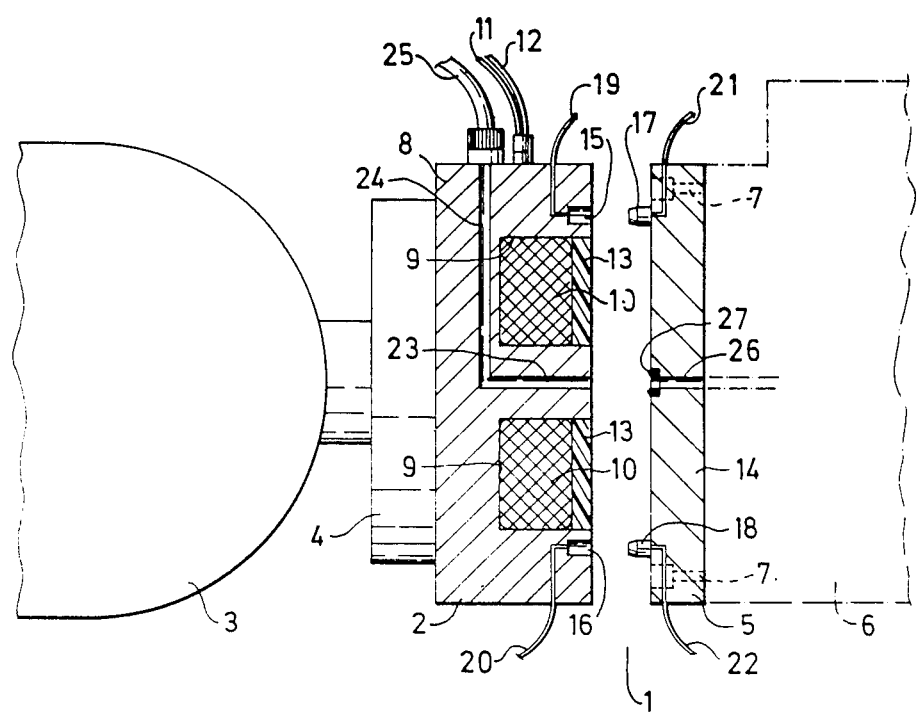

DEVICE FOR EXCHANGEABLE ATTACHMENT OF TOOLS ON AN INDUSTRIAL ROBOT

This invention relates to a device for attaching tools exchangeably on an industrial robot. The invention, more precisely, relates to a device for exchangeably attaching different types of tools and means, which are supported on the forward portion of the robot arm. As examples can be mentioned welding heads, gripping appliances, drilling machines, spray guns etc.

Known industrial robots support a tool adapted for its purpose on the forward arm portion of the robot. The tool mostly is exchangeable, but an exchange requires the tool attached to be dismantled and a desired tool to be mounted. Tools such as gripping appliances, welding heads, spray guns etc. are provided with lines for compressed air, gas, electricity and the like. At the exchange of a tool, these lines, too, are to be dismantled for being replaced by lines for the tool to be mounted. Exchanges of this kind, therefore, are intended to be carried out only with long time intervals.

In most cases a robot has certain more or less definite functions, which require only a certain type of tool, for example a gripping appliance. There is often, therefore, no need of frequent tool exchange.

It was found, however, that a robot can be utilized for several entirely different functions, provided that the tool or device carried by the robot can be exchanged rapidly and frequently. In such a case a robot can carry out a function during a time interval, during which the robot otherwise would have assumed waiting position.

The present invention eliminates the drawbacks at tool exchanges and renders it possible, that a tool can be exchanged rapidly by the robot itself.

The present invention, thus, relates to a device for exchangeably attaching tools on an industrial robot comprising an attachment device and is characterized in that the attachment device comprises a first member, which is rigidly mounted on the outer portion of a robot arm, and a second member, which is intended to be rigidly attached to each of one or more tools, by which the robot is to carry out operations, that said first member comprises an electric coil capable magnetically to attract said second member, which first and which second member are magnetically retained at each other when current flows through the coil, and that said first and said second member are provided with means for transferring electric current and/or compressed air or vacuum or substances between a source connected to the first member and a tool attached to the second member.

The invention is described in greater detail in the following, with reference to the embodiment shown in the accompanying drawing, in which the FIGURE is a section through an attachment device according to the invention.

In the FIGURE an attachment device 1 according to the invention is shown, which comprises a first member 2 intended to be mounted rigidly on the outer portion 4 of a robot arm 3, and a second member 5 intended to be mounted rigidly on a tool 6, for example a spray gun, welding head, gripping appliance, drilling machine, etc. The tool 6 is only indicated by dashed line in the FIGURE. It is intended, thus, to provide each of the tools to be exchanged on the robot with said second member 5, which is mounted rigidly by means of, for example, bolts in bolt holes 7. The said first member 2 is screwn in corresponding manner on the outer portion 4 of the robot arm.

The first member 2 of the attachment device comprises a preferably axially symmetrical body 8 with a turned cavity 9 therein. An electric coil 10 is located in said cavity 9 and connected to a voltage source via conductors 11,12. The coil 10 is sealed with plastic 13 or the like.

The said second member 5 also consists of a preferably axially symmetrical body 14.

The coil 10 when being energized is capable to attract said second member 5 with the force required for rendering the second member 5 capable to carry the tool intended and to carry out the operations intended without disengaging from the first member 2. It was found that a suitable force required for separating the members 2,5 from each other shall be at least 100 kp when a normal welding head is mounted. The force required, of course, varies with the size of the tool 6 and the operations to be carried out therewith, and the attraction force of the coil 10, of course, must be chosen depending on the circumstances.

An industrial robot of this kind carries out movements with high precision. It is hereby possible, according to one embodiment, to place different tools in different stands where the tools with the second member 5 are positioned in an accurate position. The stands with the tools, between which the robot is supposed to change, are located within the working range of the robot. The robot is programmed in a manner known per se to carry out a movement to each of the tools required, so that the first member 2 is aligned accurately to the second member 5.

For delivering a tool, the robot is programmed in a corresponding manner to put down the tool into an expedient stand whereafter the current to the coil 10 is broken. The first member 2 than can be removed from the second member 5 and tool. The robot is programmed to align thereafter the first member 2 accurately relative to the second member 5 associated with another tool in a stand intended for this tool, whereafter the current to the coil 10 is switched on. The robot, thus, can change between different tools without manual work involved.

The first member 2 preferably is provided with guide holes 15,16, and the second member with guide pins 17,18, which have a slightly conic forward end piece for facilitating accurate aligning. The guide holes and guide pins also render it easier to transfer a torque between the members. According to a preferred embodiment, said guide holes 15,16 and guide pins 17,18 are uitilized for transferring electric current from the first member 2 to the second member 5, in order thereby via conductors 19,20,21,22 to transfer current from a voltage source to a tool 6.

In the FIGURE, the two members 2,5 are shown with a certain spaced relationship. When the members co-operate to a coupling, the members abut one another whereby the guide pins 17,18 are inserted into the guide holes 15,16.

According to a further preferred embodiment, a central passageway 23 is located in the first member 2, which via a radial passageway 24 is connected by a hose 25 to a compressed air or vacuum source or another source. The second member 5 is provided in a corresponding place with a passageway 26, which is connected to the tool 6. In the second member 5, at the opening of the passageway 26 an enlargement of the passageway 26 is located, in which enlargement an O-ring 27 is located to seal between the first member 2 and second member 5. According to this embodiment, thus, compressed air or vacuum can be transferred to the tool.

By utilization of the guide holes 15,16, guide pins 17,18 and passageways 23,26, thus, both electric current and compressed air or vacuum can be transferred between the robot and a tool 6 without continuous lines being required. At the exchange of tools at a conventional coupling between robot and tool one problem, namely, is that lines for compressed air/vacuum and electric current must be disengaged from the tool.

Certain lines required for a tool, for example a paint line for a spray pistol, can be rigidly connected between a paint container and the tool.

The passageways 23,26, however, can be utilized for the transfer of both gas and liquid of different kind. The number of the passageways as well as of the guide holes and guide pins can be varied so as to render it possible to transfer different substances or functions required for the tools.

The first member 2 and second member 5 are manufactured of a suitable metallic material, preferably magnetic steel.

An essential advantage offered by the attachment device is, that the magnetic coupling between the members is a safety coupling. When the tool is subjected to a blow or to an overload of some kind, the tool disengages from the robot arm, so that neither the robot arm nor any other vital part is damaged.

The main advantage, however, according to above is that the robot itself can shift between one or several tools and that electric current and/or compressed air, vacuum etc. can be transferred between a source and the tool, without lines to be disconnected and connected at tool exchange.

It is obvious that the attachment device can be varied in many ways relative to the embodiment shown in the drawing.

The members, for example, can be designed to be not axially symmetric, and several magnet coils can be used. The transfer means for electric current and compressed air also can be designed in a different way. The invention, thus, must not be regarded restricted to the embodiment set forth above, but can be varied within its scope defined in the attached claims.

What is claimed:

1. A device for exchangeably attaching tools on an industrial robot comprising an attachment device, characterized in that the attachment device (1) comprises a first member (2) rigidly attached to the outer portion (4) of a robot arm (3) and a second member (5) intended to be rigidly attached to each one or several tools (6), by which tools (6) the robot is to carry out operations, that said first member (2) comprises an electric coil (10) capable in a magnetic way to attract said second member (5), whereby said first member (2) and said second member (5) are retained in a magnetic way to each other when current flows through the coil (10), and that said first member (2) and said second member (5) are provided with means (15–18, 23, 24, 26) for transferring any combination of things selected from a group consisting of electric current, compressed air, vacuum, and other substances between a source connected to the first member (2) and a tool (6) attached to the second member (5), said means comprise at least guide holes (16,16) and guide pins (17,18) in said members (2,5) and said members have at least some of said guide holes (15,16) and said guide pins (17,18) which are complementary and intended to co-operate and have a structural connection with their associated members which enables a transfer of tool operational torque from either one of said associated members to the other one of said associated members when the members (2,5) are coupled together and that said at least some of said guide holes (15, 16) and guide pins (17, 18) are also connected to electric conductors for transferring electric current between said members.

2. A device as defined in claim 1, characterized in that said means for transferring things comprise in each member (2,5) passageways (23,24,26), which when the members (2,5) are coupled together in the way intended are connected for the transfer of said things.

* * * * *